US012795541B2

(12) United States Patent
Loehr et al.

(10) Patent No.: US 12,795,541 B2
(45) Date of Patent: Nov. 10, 2026

(54) INDICATION OF A REQUEST FOR SIDELINK RESOURCES

(71) Applicant: Lenovo (Singapore) Pte. Ltd., New Tech Park (SG)

(72) Inventors: Joachim Loehr, Wiesbaden (DE); Prateek Basu Mallick, Dreieich (DE); Karthikeyan Ganesan, Kronberg im Taunus (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 522 days.

(21) Appl. No.: 18/016,151

(22) PCT Filed: Jul. 10, 2021

(86) PCT No.: PCT/IB2021/056208
§ 371 (c)(1),
(2) Date: Jan. 13, 2023

(87) PCT Pub. No.: WO2022/013698
PCT Pub. Date: Jan. 20, 2022

(65) Prior Publication Data
US 2023/0262738 A1 Aug. 17, 2023

Related U.S. Application Data

(60) Provisional application No. 63/051,184, filed on Jul. 13, 2020, provisional application No. 63/051,233,
(Continued)

(51) Int. Cl.
*H04W 52/02* (2009.01)
*H04L 1/1812* (2023.01)
(Continued)

(52) U.S. Cl.
CPC ....... *H04W 52/0235* (2013.01); *H04L 1/1812* (2013.01); *H04L 5/0055* (2013.01);
(Continued)

(58) Field of Classification Search
CPC ......... H04W 52/0235; H04W 28/0268; H04W 52/0216; H04W 52/0245; H04W 72/04;
(Continued)

(56) References Cited

U.S. PATENT DOCUMENTS

| | | | |
|---|---|---|---|
| 11,082,908 | B2 | 8/2021 | Cheng et al. |
| 2012/0120828 | A1 | 5/2012 | Anderson et al. |

(Continued)

FOREIGN PATENT DOCUMENTS

| | | | |
|---|---|---|---|
| CN | 110574443 | A | 12/2019 |
| EP | 3500028 | A1 | 7/2017 |

(Continued)

OTHER PUBLICATIONS

PCT/IB2021/056211, "Notification of Transmittal of the International Search Report and the Written Opinion of the International Searching Authority, or the Declaration", International Searching Authority, Oct. 18, 2021, pp. 1-17.
(Continued)

*Primary Examiner* — Ayaz R Sheikh
*Assistant Examiner* — Tarell A Hampton
(74) *Attorney, Agent, or Firm* — Kunzler Needham Hilton

(57) ABSTRACT

Apparatuses, methods, and systems are disclosed for indication of a request for sidelink resources. One method includes receiving a hybrid automatic repeat request feedback message over a first radio interface. The method includes, in response to determining that the hybrid automatic repeat request feedback message indicates an unsuccessful decoding of a corresponding transport block, transmitting a negative acknowledgment on a physical uplink
(Continued)

control channel of a second radio interface. The negative acknowledgment indicates a request for sidelink resources on the first radio interface. The method includes starting a timer in response to transmitting the negative acknowledgment.

17 Claims, 8 Drawing Sheets

Related U.S. Application Data filed on Jul. 13, 2020, provisional application No. 63/051,207, filed on Jul. 13, 2020, provisional application No. 63/051,217, filed on Jul. 13, 2020.

(51) Int. Cl.

| | |
|---|---|
| ***H04L 5/00*** | (2006.01) |
| ***H04W 28/02*** | (2009.01) |
| ***H04W 72/04*** | (2023.01) |
| ***H04W 72/232*** | (2023.01) |
| ***H04W 72/25*** | (2023.01) |
| ***H04W 72/40*** | (2023.01) |
| ***H04W 76/14*** | (2018.01) |
| ***H04W 76/28*** | (2018.01) |

(52) U.S. Cl.

CPC ... *H04W 28/0268* (2013.01); *H04W 52/0216* (2013.01); *H04W 52/0245* (2013.01); *H04W 72/04* (2013.01); *H04W 72/232* (2023.01); *H04W 72/25* (2023.01); *H04W 72/40* (2023.01); *H04W 76/14* (2018.02); *H04W 76/28* (2018.02)

(58) Field of Classification Search

CPC ... H04W 72/232; H04W 72/25; H04W 72/40; H04W 76/14; H04W 76/28; H04W 88/04; H04W 92/18; H04L 1/1812; H04L 5/0055; H04L 1/188; Y02D 30/07

See application file for complete search history.

(56) References Cited

U.S. PATENT DOCUMENTS

| | | | | |
|---|---|---|---|---|
| 2017/0048903 | A1* | 2/2017 | Yi | H04W 4/70 |
| 2018/0220366 | A1 | 8/2018 | Bergstrom et al. | |
| 2019/0174411 | A1* | 6/2019 | Xu | H04W 52/02 |
| 2019/0313375 | A1* | 10/2019 | Loehr | H04W 72/04 |
| 2020/0029318 | A1* | 1/2020 | Guo | H04L 5/0055 |
| 2020/0053647 | A1 | 2/2020 | Chae et al. | |
| 2020/0100179 | A1* | 3/2020 | Zhou | H04W 52/0209 |
| 2020/0122907 | A1 | 4/2020 | Dao et al. | |
| 2020/0374971 | A1 | 11/2020 | Liu et al. | |
| 2021/0059004 | A1 | 2/2021 | Wu et al. | |
| 2021/0227465 | A1* | 7/2021 | Kung | H04W 76/28 |
| 2022/0312241 | A1* | 9/2022 | Xu | H04L 1/1883 |
| 2022/0353815 | A1* | 11/2022 | Lin | H04W 52/0232 |
| 2022/0377662 | A1 | 11/2022 | Sun et al. | |
| 2023/0052102 | A1 | 2/2023 | Park et al. | |
| 2023/0156854 | A1 | 5/2023 | Cheng et al. | |
| 2023/0199578 | A1 | 6/2023 | Wu et al. | |
| 2023/0232492 | A1* | 7/2023 | Han | H04W 72/0446 370/329 |
| 2023/0262601 | A1 | 8/2023 | Ganesan et al. | |
| 2023/0276364 | A1 | 8/2023 | Basu Mallick et al. | |
| 2023/0276527 | A1 | 8/2023 | Karampatsis et al. | |
| 2023/0328840 | A1 | 10/2023 | Cheng et al. | |
| 2025/0055508 | A1* | 2/2025 | Islam | H04W 72/044 |

FOREIGN PATENT DOCUMENTS

| | | | |
|---|---|---|---|
| WO | 2016089294 | A1 | 9/2016 |
| WO | 2017204726 | A1 | 11/2017 |
| WO | 2018016882 | A1 | 1/2018 |
| WO | 2018175760 | A1 | 9/2018 |
| WO | 2020060890 | A1 | 3/2020 |

OTHER PUBLICATIONS

PCT/IB2021/056259, "Notification of Transmittal of the International Search Report and the Written Opinion of the International Searching Authority, or the Declaration", International Searching Authority, Dec. 23, 2021, pp. 1-23.

PCT/IB2021/056208, "Notification of Transmittal of the International Search Report and the Written Opinion of the International Searching Authority, or the Declaration", International Searching Authority, Jan. 7, 2022, pp. 1-21.

PCT/IB2021/056209, "Notification of Transmittal of the International Search Report and the Written Opinion of the International Searching Authority, or the Declaration", International Searching Authority, Jan. 24, 2022, pp. 1-25.

PCT/IB2021/056208, "Invitation to Pay Additional fees and, Where Applicable, Protest Fee", International Searching Authority, Nov. 8, 2021, pp. 1-17.

LG Electronics, "Discussion on NR sidelink resource allocation for Mode 1", 3GPP TSG RAN WG1 #100bis R1-2001885, Apr. 20-30, 2020, pp. 1-28.

Sequans Communications, "Sidelink maintenance for evolved L2 relay", 3GPP TSG-RAN WG2#98 R2-1705126, May 15-19, 2017, pp. 1-4.

Huawei et al., "Discussion on remaining MAC open issues for 5G V2X with NR SL", 3GPP TSG-RAN WG2 Meeting #109-bis electronic R2-20xxxxx, Apr. 20-30, 2020, pp. 1-28.

Lenovo, "Remaining MAC Issues", 3GPP TSG RAN WG2 Meeting#110-e R2-2005039, Jun. 1-12, 2020, pp. 1-10.

LG Electronics, "WID revision: NR sidelink enhancement", 3GPP TSG RAN Meeting #88e RP-201385, Jun. 29-Jul. 3, 2020, pp. 1-6.

Qualcomm Inc et al., "New Solution: QoS aware power efficient PC5 communication", SA WG2 Temporary Document S2-2004714, Jun. 1-12, 2020, pp. 1-4.

Lenovo et al., "KI#1, Sol#5: Additional option on PC5 DRX configuration", 3GPP TSG-SA WG2 Meeting #141e S2-2007237, Oct. 12-23, 2020, pp. 1-6.

3GPP, "3rd Generation Partnership Project; Technical Specification Group Services and System Aspects; Study on architecture enhancements for 3GPP support of advanced Vehicle-to-Everything (V2X) services; Phase 2 (Release 17)", 3GPP TR 23.776 V0.1.0, Jun. 2020, pp. 1-11.

3GPP, "3rd Generation Partnership Project; Technical Specification Group Services and System Aspects; Study on security aspects of 3GPP support for advanced Vehicle-to-Everything (V2X) services (Release 16)", 3GPP TR 33.836 V16.0.0, Jul. 2020, pp. 1-51.

3GPP, "3rd Generation Partnership Project; Technical Specification Group Services and System Aspects; Service requirements for V2X services; Stage 1 (Release 15)", 3GPP TS 22.185 V15.0.0, Jun. 2018, pp. 1-14.

3GPP, "3rd Generation Partnership Project; Technical Specification Group Services and System Aspects; Enhancement of 3GPP support for V2X scenarios; Stage 1 (Release 16)", 3GPP TS 22.186 V16.2.0, Jun. 2019, pp. 1-18.

3GPP, "3rd Generation Partnership Project; Technical Specification Group Services and System Aspects; Architecture enhancements for 5G System (5GS) to support Vehicle-to-Everything (V2X) services (Release 16)", 3GPP TS 23.287 V16.2.0, Mar. 2020, pp. 1-53.

3GPP, "3rd Generation Partnership Project; Technical Specification Group Services and System Aspects; Procedures for the 5G System (5GS); Stage 2 (Release 16)", 3GPP TS 23.502 V16.4.0, Mar. 2020, pp. 1-582.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300 V16.1.0, Mar. 2020, pp. 1-386.

(56) References Cited

OTHER PUBLICATIONS

3GPP, "3rd Generation Partnership Project; Technical Specification Group Radio Access Network; NR; Physical layer procedures for control (Release 16)", 3GPP TS 38.213 V16.1.0, Mar. 2020, pp. 1-156.
3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.
3GPP, "3rd Generation Partnership Project; Technical Specification Group Radio Access Network; NR; NR and NG-RAN Overall Description; Stage 2 (Release 16)", 3GPP TS 38.300 V16.1.0, Mar. 2020, pp. 1-133.
3GPP, "3rd Generation Partnership Project; Technical Specification Group Radio Access Network; NR; Medium Access Control (MAC) protocol specification (Release 16)", 3GPP TS 38.321 V16.0.0, Mar. 2020, pp. 1-141.
3GPP, "3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.
LG Electronics, "Summary of email discussion on Rel-17 sidelink enhancement", 3GPP TSG RAN #86 RP-192745, Dec. 9-12, 2019, pp. 1-27.
3GPP, "3rd Generation Partnership Project; Technical Specification Group Radio Access Network; Study on LTE Device to Device Proximity Services; Radio Aspects (Release 12)", 3GPP TR 36.843 V12.0.1, Mar. 2014, pp. 1-50.
3GPP, "3rd Generation Partnership Project; Technical Specification Group Radio Access Network; Study on evaluation methodology of new Vehicle-to-Everything (V2X) use cases for LTE and NR; (Release 15)", 3GPP TR 37.885 V15.3.0, Jun. 2019, pp. 1-38.
3GPP, "3rd Generation Partnership Project; Technical Specification Group Radio Access Network; NR; Study on User Equipment (UE) power saving in NR (Release 16)", 3GPP TR 38.840 V16.0.0, Jun. 2019, pp. 1-74.
3GPP, "3rd Generation Partnership Project; Technical Specification Group Radio Access Network; NR; Physical channels and modulation (Release 16)", 3GPP TS 38.211 V16.1.0, Mar. 2020, pp. 1-130.
3GPP, "3rd Generation Partnership Project; Technical Specification Group Radio Access Network; NR; Multiplexing and channel coding (Release 16)", 3GPP TS 38.212 V16.1.0, Mar. 2020, pp. 1-146.
U.S. Appl. No. 18/016,119 , "Office Action Summary", U.S. Patent and Trademark Office, Apr. 10, 2025, pp. 1-44.
489 U.S. Appl. No. 18/016,052, "Office Action Summary", United States Patent and Trademark Office, Jun. 18, 2025, pp. 1-31.
491 U.S. Appl. No. 18/016,147, "Office Action Summary", United States Patent and Trademark Office, Jun. 18, 2025, pp. 1-31.
LG Electronics Inc. (Rapporteur) "Report of [Post109bis-e][957][V2X]: MAC issues (LG)", 3GPP TSG-RAN WG2 #110-e R2-2005720, Jun. 1-12, 2020, pp. 1-97.

* cited by examiner

400

INDICATION OF A REQUEST FOR SIDELINK RESOURCES

CROSS-REFERENCE TO RELATED APPLICATIONS

This application claims priority to U.S. Patent application Ser. No. 63/051,184 entitled "APPARATUSES, METHODS, AND SYSTEMS FORA SIDELINK DRX MECHANISM-INTERACTION WITH UU DRX OPERATION" and filed on Jul. 13, 2020 for Joachim Loehr, U.S. Patent Application Ser. No. 63/051,207 entitled "APPARATUSES, METHODS, AND SYSTEMS FOR SIDELINK POWER SAVING USING A DRX MECHANISM AND MINIMIZING ENSUING HALF DUPLEX ISSUES" and filed on Jul. 13, 2020 for Prateek Basu Mallick, U.S. Patent Application Ser. No. 63/051,217 entitled "APPARATUSES, METHODS, AND SYSTEMS FOR SUPPORTING POWER SAVING FOR PC5 COMMUNICATIONS" and filed on Jul. 13, 2020 for Dimitrios Karampatsis, and U.S. Patent Application Ser. No. 63/051,233 entitled "APPARATUSES, METHODS, AND SYSTEMS FOR ENHANCEMENT FOR SL POWER SAVING" and filed on Jul. 13, 2020 for Karthikeyan Ganesan, all of which are incorporated herein by reference in their entirety.

FIELD

The subject matter disclosed herein relates generally to wireless communications and more particularly relates to indication of a request for sidelink resources.

BACKGROUND

In certain wireless communications networks, power and other resources may be used inefficient. For example, sidelink resources may be statically used for sidelink transmissions.

BRIEF SUMMARY

Methods for indication of a request for sidelink resources are disclosed. Apparatuses and systems also perform the functions of the methods. One embodiment of a method includes receiving a hybrid automatic repeat request feedback message over a first radio interface. In some embodiments, the method includes, in response to determining that the hybrid automatic repeat request feedback message indicates an unsuccessful decoding of a corresponding transport block, transmitting a negative acknowledgment on a physical uplink control channel of a second radio interface. The negative acknowledgment indicates a request for sidelink resources on the first radio interface. In certain embodiments, the method includes starting a timer in response to transmitting the negative acknowledgment.

One apparatus for indication of a request for sidelink resources includes a receiver that receives a hybrid automatic repeat request feedback message over a first radio interface. In various embodiments, the apparatus includes a transmitter that, in response to determining that the hybrid automatic repeat request feedback message indicates an unsuccessful decoding of a corresponding transport block, transmits a negative acknowledgment on a physical uplink control channel of a second radio interface. The negative acknowledgment indicates a request for sidelink resources on the first radio interface. In some embodiments, the apparatus includes a processor that starts a timer in response to transmitting the negative acknowledgment.

One embodiment of a method for providing assistance information includes determining a change in a discontinuous reception configuration applied on a first radio interface. In some embodiments, the method includes, in response to determining the change in the discontinuous reception configuration, triggering transmission of assistance information on a second radio interface. In certain embodiments, the method includes, in response to triggering transmission of assistance information on the second radio interface, transmitting the assistance information on the second radio interface.

One apparatus for providing assistance information includes a processor that: determines a change in a discontinuous reception configuration applied on a first radio interface; and, in response to determining the change in the discontinuous reception configuration, triggers transmission of assistance information on a second radio interface. In various embodiments, the apparatus includes a transmitter that, in response to triggering transmission of assistance information on the second radio interface, transmits the assistance information on the second radio interface.

One embodiment of a method for receiving assistance information includes receiving, on a second radio interface, assistance information corresponding to a first radio interface. In some embodiments, the method includes determining discontinuous reception configuration information for the second radio interface based on the assistance information corresponding to the first radio interface. In certain embodiments, the method includes transmitting the discontinuous reception configuration information on the second radio interface.

One apparatus for receiving assistance information includes a receiver that receives, on a second radio interface, assistance information corresponding to a first radio interface. In various embodiments, the apparatus includes a processor that determines discontinuous reception configuration information for the second radio interface based on the assistance information corresponding to the first radio interface. In some embodiments, the apparatus includes a transmitter that transmits the discontinuous reception configuration information on the second radio interface.

One embodiment of a method for sidelink resource determination includes receiving a sidelink grant. In some embodiments, the method includes determining whether sidelink resources allocated by the sidelink grant are within a discontinuous reception active time associated with a sidelink logical channel. In certain embodiments, the method includes, in response to determining that the sidelink resources allocated by the sidelink grant are within the discontinuous reception active time associated with the sidelink logical channel, using the sidelink logical channel in a logical channel prioritization procedure, a destination selection procedure, or a combination thereof.

One apparatus for sidelink resource determination includes a receiver that receives a sidelink grant. In various embodiments, the apparatus includes a processor that: determines whether sidelink resources allocated by the sidelink grant are within a discontinuous reception active time associated with a sidelink logical channel; and, in response to determining that the sidelink resources allocated by the sidelink grant are within the discontinuous reception active time associated with the sidelink logical channel, uses the sidelink logical channel in a logical channel prioritization procedure, a destination selection procedure, or a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
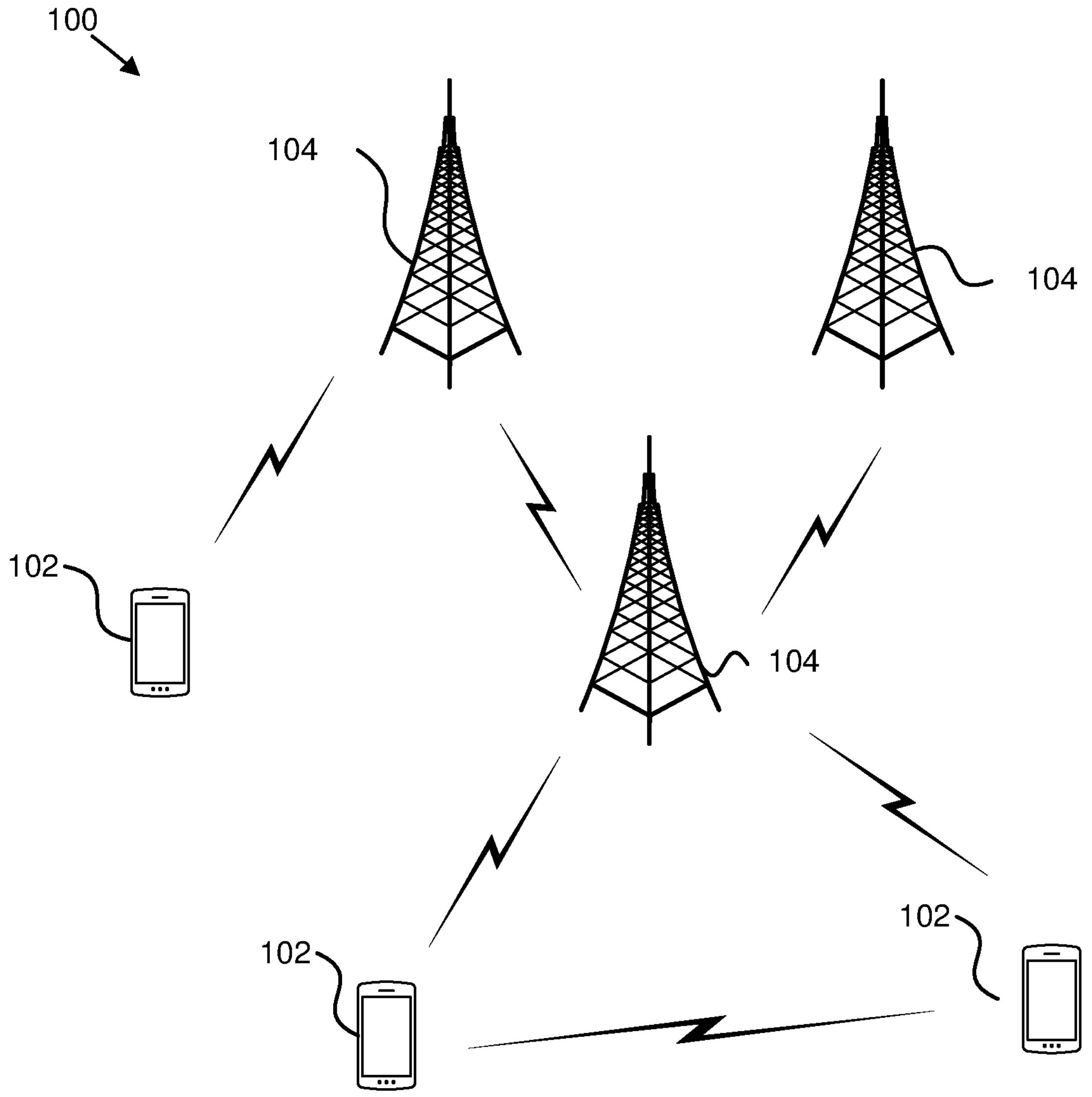
FIG. 1 is a schematic block diagram illustrating one embodiment of a wireless communication system for indication of a request for sidelink resources.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding FIGURES. Like numbers refer to like elements in all FIGURES, including alternate embodiments of like elements.

FIG. 1 depicts an embodiment of a wireless communication system 100 for indication of a request for sidelink resources. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive a hybrid automatic repeat request feedback message over a first radio interface. In some embodiments, the remote unit 102 may, in response to determining that the hybrid automatic repeat request feedback message indicates an unsuccessful decoding of a corresponding transport block, transmit a negative acknowledgment on a physical uplink control channel of a second radio interface. The negative acknowledgment indicates a request for sidelink resources on the first radio interface. In certain embodiments, the remote unit 102 may start a timer in response to transmitting the negative acknowledgment. Accordingly, the remote unit 102 may be used for indication of a request for sidelink resources.

In certain embodiments, a remote unit 102 may determine a change in a discontinuous reception configuration applied on a first radio interface. In some embodiments, the remote unit 102 may, in response to determining the change in the discontinuous reception configuration, trigger transmission of assistance information on a second radio interface. In certain embodiments, the remote unit 102 may, in response to triggering transmission of assistance information on the second radio interface, transmit the assistance information on the second radio interface. Accordingly, the remote unit 102 may be used for providing assistance information.

In various embodiments, a network unit 104 may receive, on a second radio interface, assistance information corresponding to a first radio interface. In some embodiments, the network unit 104 may determine discontinuous reception configuration information for the second radio interface based on the assistance information corresponding to the first radio interface. In certain embodiments, the network unit 104 may transmit the discontinuous reception configuration information on the second radio interface. Accordingly, the network unit 104 may be used for receiving assistance information.

In certain embodiments, a remote unit 102 may receive a sidelink grant. In some embodiments, the remote unit 102 may determine whether sidelink resources allocated by the sidelink grant are within a discontinuous reception active time associated with a sidelink logical channel. In certain embodiments, the method includes, in response to determining that the sidelink resources allocated by the sidelink grant are within the discontinuous reception active time associated with the sidelink logical channel, using the sidelink logical channel in a logical channel prioritization procedure, a destination selection procedure, or a combination thereof. Accordingly, the remote unit 102 may be used for sidelink resource determination.

Figure 2:
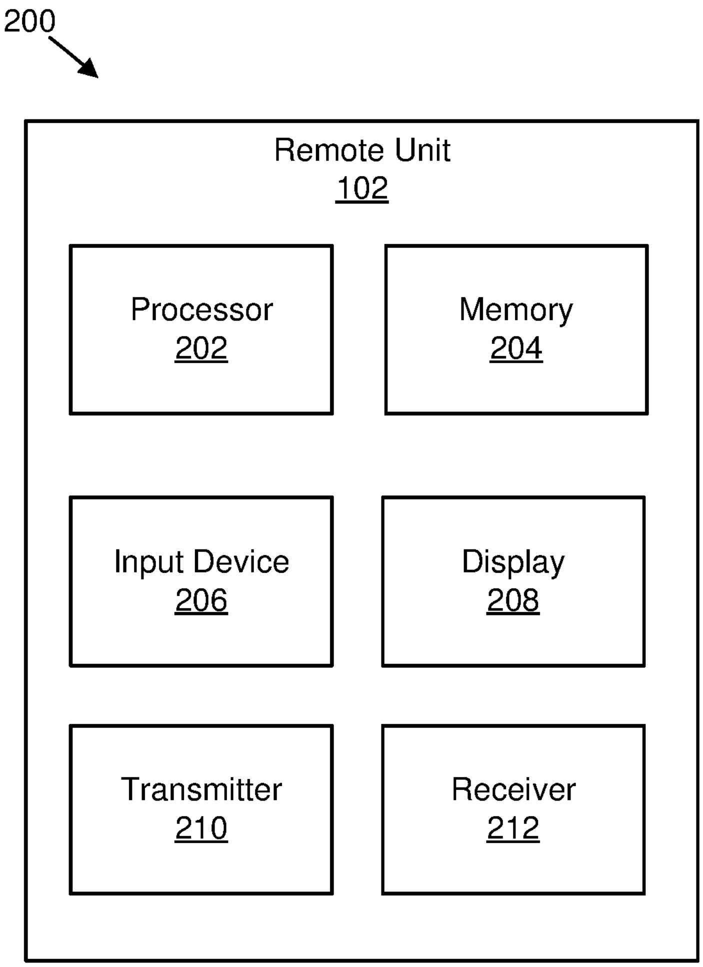
FIG. 2 is a schematic block diagram illustrating one embodiment of an apparatus that may be used for indication of a request for sidelink resources.

FIG. 2 depicts one embodiment of an apparatus 200 that may be used for indication of a request for sidelink resources. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 receives a hybrid automatic repeat request feedback message over a first radio interface. In various embodiments, the transmitter 210, in response to determining that the hybrid automatic repeat request feedback message indicates an unsuccessful decoding of a corresponding transport block, transmits a negative acknowledgment on a physical uplink control channel of a second radio interface. The negative acknowledgment indicates a request for sidelink resources on the first radio interface. In some embodiments, the processor 202 starts a timer in response to transmitting the negative acknowledgment.

In some embodiments, the processor 202: determines a change in a discontinuous reception configuration applied on a first radio interface; and, in response to determining the change in the discontinuous reception configuration, triggers transmission of assistance information on a second radio interface. In various embodiments, the transmitter 210, in response to triggering transmission of assistance information on the second radio interface, transmits the assistance information on the second radio interface.

In various embodiments, the receiver 212 receives a sidelink grant. In various embodiments, the processor 202: determines whether sidelink resources allocated by the sidelink grant are within a discontinuous reception active time associated with a sidelink logical channel; and, in response to determining that the sidelink resources allocated by the sidelink grant are within the discontinuous reception active time associated with the sidelink logical channel, uses the sidelink logical channel in a logical channel prioritization procedure, a destination selection procedure, or a combination thereof.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
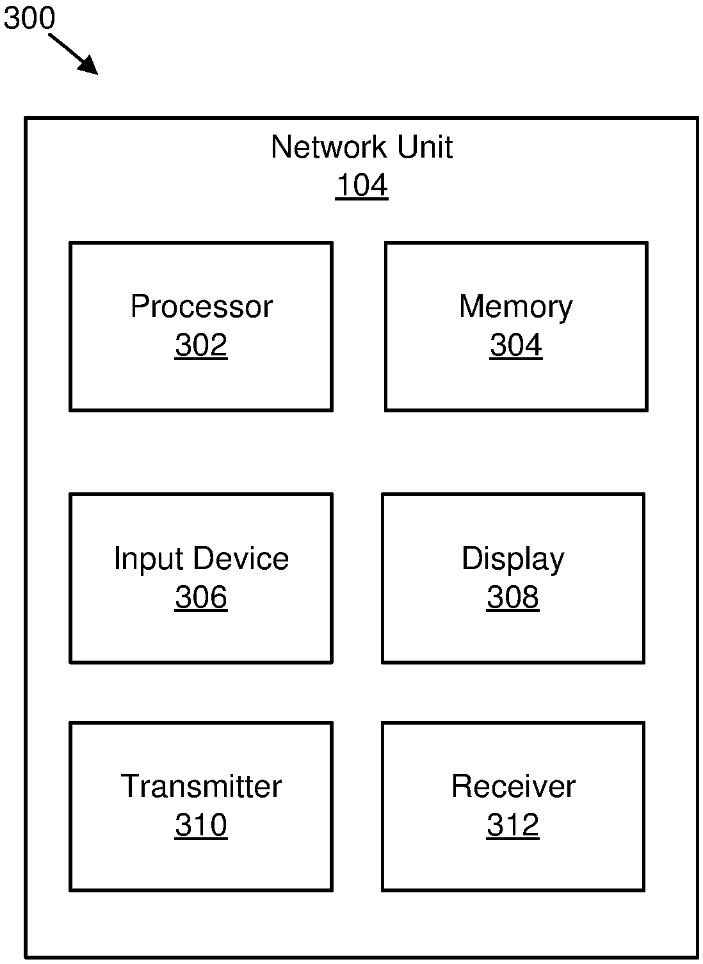
FIG. 3 is a schematic block diagram illustrating one embodiment of an apparatus that may be used for receiving assistance information.

FIG. 3 depicts one embodiment of an apparatus 300 that may be used for receiving assistance information. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 receives, on a second radio interface, assistance information corresponding to a first radio interface. In various embodiments, the processor 302 determines discontinuous reception configuration information for the second radio interface based on the assistance information corresponding to the first radio interface. In some embodiments, the apparatus includes a transmitter that transmits the discontinuous reception configuration information on the second radio interface.

In certain embodiments, sidelink ("SL") data transmission and/or reception activity (e.g., also referred to as SL discontinuous reception ("DRX") herein), may not be coordinated with a DRX operation on an interface between a UE and a base station ("Uu") interface. In such embodiments, a transmitter ("TX") user equipment ("UE") (e.g., using mode 1 resource allocation) may be in a sleep mode (e.g., DRX) on the Uu interface (e.g., not monitoring a physical downlink control channel ("PDCCH")) even though the UE is expected to receive sidelink ("SL") resource allocations by a gNB for SL data transmission on a UE to UE interface ("PC5") interface.

In some embodiments, if SL data transmission and/or reception activity on a PC5 interface is not aligned with a DRX operation on a Uu interface, an active time on the Uu interface may be unnecessarily extended leading to some increased battery power consumption.

In various embodiments, a TX UE may be always in an active time on a Uu interface to be always ready to receive some SL downlink control information ("DCI"). However, such embodiments may lead to poor battery lifetime, which may be undesirable for pedestrian vehicle to everything ("V2X") UEs.

In certain embodiments, each SL logical channel ("LCH"), SL service, SL application, and/or SL destination may be associated with a preconfigured and/or fixed SL-DRX-configuration that is defined as a combination of parameters (e.g., offset_std_On-duration, On-duration-timer, and periodicity). In such embodiments, a SL On-duration starts at a fixed time offset (e.g., offset_std_On-duration) from a first time (e.g., Time_0) based on a sync source from a global navigation satellite system ("GNSS"), gNB directly, or indirectly from sidelink synchronization signals ("SLSS"). The On-duration-timer may be restarted periodically with a periodicity. It should be noted that the term "SL active time" may refer to a time period where a SL UE transmits and receives data on a PC5 interface. Moreover, the term "SL transmission and/or reception window" as used herein may be interchangeable with the term SL DRX configuration. It both refers to the time periods where a Sidelink UE is "awake and/or active" on the PC5 interface to transmit and receive data. The SL transmission and/or reception window may facilitate SL data transmissions for a specific application, service, destination, and/or LCH being synchronized between UEs interested in such service and/or application. The TX side of a UE may need to be aware of when receive ("RX") UEs are "listening" for data of a specific SL LCH and/or application (e.g., transmission window), and the RX side of UE needs to know when to monitor for SL data of a specific SL LCH and/or application (e.g., reception window). The SL transmission and/or reception window may improve a UE's power consumption, as a UE interested in a particular SL service and/or application needs to be only "active" on the PC5 interface (e.g., monitor for sidelink control information ("SCI") and/or physical sidelink shared channel ("PSSCH")) at specific predefined time periods.

In a first embodiment, there may be interaction between SL data transmission and a Uu DRX state and/or timers. In such embodiments, DRX related timers and/or states for controlling a DRX active time on a Uu interface may be updated based on SL data and/or control transmission and/or reception on a PC5 interface. To ensure that a UE is in an active time on the Uu interface and to monitor a physical downlink control channel ("PDCCH") for SL grants if SL data transmissions and/or reception occurs on the PC5 interface, some linkage between the active time on the Uu interface and the sidelink data activity on the PC5 interface may be used. In certain embodiments of the first embodiment, a UE goes to active time on the Uu interface monitoring PDCCH in response to having transmitted a negative acknowledgement ("NACK") to a gNB on PUCCH triggered by the reception of a NACK on a physical sidelink feedback channel ("PSFCH") from an RX UE. To receive SL grants for a retransmission, the UE may be in DRX active time and may monitor for PDCCH after having sent a NACK on PUCCH for a SL transmission (e.g., in mode 1). It should be noted that the UE may not be immediately in an active time after having sent NACK on PUCCH in ActiveTime, but may be in the active time after some predefined offset similar to DRX operation on Uu interface. As may be appreciated, there may be various embodiments that facilitate achieving that a UE is in a DRX active time upon having sent a NACK for a SL resource on a PUCCH. In some embodiments of the first embodiment, a UE behavior upon having sent a NACK for a SL resource allocation on PUCCH follows at least one of the following: 1) start or restart drx-InactivityTimer in a first symbol after an end of a PUCCH transmission (e.g., NACK); 2) start the drx-RetransmissionTimerDL for a corresponding hybrid automatic repeat request ("HARQ") process in a first symbol after transmission of NACK on PUCCH; and/or 3) start a new drx-timer on Uu that is related to SL transmissions and/or receptions in response to having sent PUCCH (e.g., NACK) (e.g., drx-RetransmissionTimerSL). While drx-RetransmissionTimerSL is running, a UE is in active time and monitors PDCCH for SL DCIs.

In a second embodiment, DRX cycles (e.g., transmission and/or reception window) for PC5 interface and DRX active time for Uu may be aligned (e.g., for mode 1).

In the second embodiment, a UE provides information on SL reception and/or transmission windows for a PC5 interface to a gNB to allow gNB aligning UE's Uu DRX configuration and/or active time based on the received information. To facilitate a UE being in the DRX active time and monitoring PDCCH for SL DCIs while the UE is receiving and/or transmitting SL data on the PC5 interface, some coordination between time periods where the UE is active (e.g., transmit and/or receive) on the PC5 interface and the UE's Uu DRX settings and/or configurations may be used. In certain embodiments of the second embodiment, a UE reports within UE assistance information ("UAI") or sidelink assistance information ("SAI") to a gNB timing information indicating when the UE is active on a PC5 interface (e.g., transmission and/or receiving SL data). The timing information may be a "SL transmission and/or reception window" or PC5 DRX pattern information as described herein. The UE informs the gNB about the PC5 reception and/or transmission window information whenever there is a change on the PC5 transmission and/or reception activity (e.g., UE triggers the transmission of UAI and/or SAI information). The information that the UE reports to the gNB may be: 1) a TX UE reports a plurality of SL DRX configurations and/or "transmission and/or reception window information" to the gNB, e.g., reporting SL DRX configuration per SL destination and/or service; 2) the TX UE reports a SL DRX configuration and/or "SL reception and/or transmission window" that is a superposition and/or superset (e.g., created from an overlap of all configured SL DRX cycles) to the gNB; and/or 3) the TX UE reports SL DRX cycle only for mode 1 LCHs to the gNB and does not report or use them for superset calculation for mode 2 LCHs.

In various embodiments, in response to reception of PC5 DRX information provided by a TX UE, a gNB may configure a UE's Uu DRX cycle based on a superset of SL DRX cycles reported such that it matches the SL DRX Cycle. In certain embodiments, a gNB may configure a SL-specific DRX configuration for a TX UE on a Uu interface (e.g., in addition to a legacy DRX configuration targeted for DL and/or UL data on the Uu interface). The TX UE may only monitor SL DCIs during the time where UE is only in active time according to the SL DRX configuration (e.g., to reduce power consumption) and monitor Uu related DCIs during the time where the UE is also in DRX active time according to legacy DRX configuration, timers, and/or rules.

In a third embodiment, there may be an active time on a Uu interface triggered by a SL scheduling request ("SR") and/or buffer status report ("BSR") sent on the Uu interface (e.g., the active time is only triggered by a UE).

In some embodiments of the third embodiment, the UE goes to DRX active time based on SL related UL transmissions sent on the Uu interface (e.g., SL SR and/or BSR). In various embodiments of the third embodiment, the UE goes to DRX active time on the Uu interface in response to having sent a SL related resource request (e.g., such as SL SR and/or BSR or SL related acknowledgment ("ACK") and/or NACK on PUCCH). To be able to receive SL DCI after having sent a request for SL resources on the Uu interface, the UE may be in DRX active time (e.g., whenever there is new SL data in the UE and the UE requests resources for PC5) and the UE may go to active time and monitor for SL DCI.

In certain embodiments of the third embodiment, a new DRX timer may be started upon having sent a request for SL resources on the Uu interface. While the new DRX timer is running, the UE considers itself to be in DRX active time. The new DRX timer may have a different behavior if the UE sends a SR on PUCCH to request resources for UL data (e.g., UL shared channel ("SCH") resources) and if the UE sends (e.g., SL) SR and/or BSR to request resources for the PC5 interface (e.g., PSSCH resources). In some embodiments of the third embodiment, the UE is in active time for the Uu interface in response to having sent an ACK on PUCCH for a SL data transmission (e.g., ACK has been received on the PSFCH and/or packet delay budget ("PDB") associated with the transport block ("TB") is expired). In various embodiments of the third embodiment, the UE considers itself in active time after having sent an ACK on PUCCH for a SL data transmission only if the UE has SL data in it's buffer available for transmission. As may be appreciated, the UE may not immediately be in an active time after having sent an ACK on PUCCH for a SL data transmission, but may be in the active time after some predefined offset. In some embodiments of the third embodiment, the UE may go to active time and monitor for SL DCI after having sent a SL BSR on physical uplink shared channel to ("PUCCH") and/or after having provided uplink assistance information ("UAI") including information for SL semi-persistent scheduling ("SPS"). In various embodiments of the third embodiment, a TX UE may delay the transmission of a SL SR such that the UE sends the SL SR if in active time on the Uu interface to save power.

One implementation of the third embodiment is illustrated in Table 1.

TABLE 1

| |
|---|
| When a DRX cycle is configured, the Active Time includes the time while: |
| - drx-onDurationTimer or drx-InactivityTimer or drx-RetransmissionTimerDL or drx-RetransmissionTimerUL or ra-ContentionResolutionTimer (as described in clause 5.1.5) is running; or |
| - a Scheduling Request is sent on PUCCH and is pending (as described in clause 5.4.4); or |
| - a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4). |
| - a HARQ feedback is sent on PUCCH for a SL transmission |
| - a SL BSR MAC CE is sent on PUSCH indicating a non-zero buffer status |

In some embodiments of the third embodiment, transmission of a SL BSR medium access control ("MAC") control element ("CE") indicating a zero buffer status (e.g., no SL data available for transmission) sent on a Uu interface may trigger the UE to stop monitoring PDCCH for SL DCI on the Uu interface. If the UE is not required to be in DRX active time for other reasons (e.g., Uu related DRX timers like DRX-inactivityTimer are running), the UE may go to a sleep mode. In various embodiments of the third embodiment, new SL related control information may be used which indicates to the gNB that there is no SL data available for transmission (e.g., for a predefined time period or until some new indication of SL data becomes available for transmission is provided). In response to having provided such information to the gNB, the TX UE stops monitoring a PDCCH for SL DCI (e.g., for the predefined time period).

In certain embodiments, a DRX active time on a Uu interface may be guided by sidelink and/or V2X related activity on the PC5 interface (e.g., sidelink and/or V2X related signaling on the Uu interface). For example, if the UE has no Uu data radio bearer ("DRB") established, the UE may be only in DRX active time to receive PDCCH for SL DCI (e.g. upon having sent NACK on PUCCH for a SL transmission and/or in response to having sent a SR on PUCCH triggered by SL BSR or SL BSR on PUSCH). Even though there are no Uu DRBs established, the UE may be configured with some DRX configuration (e.g., long DRX cycle with short OnDuration).

In a fourth embodiment, there may be separate search spaces and drx ActiveTimes for Uu DCI and SL DCI.

In some embodiments, a UE using resource allocation mode 1 may be configured with separate search spaces for Uu DCIs and SL DCIs. In various embodiments, a UE may have two separate active times on a Uu interface (e.g., one for Uu related data activity—also referred to as Uu active time, and one for SL related activity—referred to as SL active time). While the UE is in Uu active time, the UE monitors PDCCH in the Uu DCI related search space, and while the UE is in SL active time, the UE monitors PDCCH in the SL related search space for SL DCI on the Uu interface. Separating the search spaces for Uu DCIs and SL DCIs may achieve power saving gain. In various embodiments, a Uu active time and a SL active time on a Uu interface may overlap, leading to a situation in which the UE monitors PDCCH on both the Uu related search space (e.g., or spaces) and the SL related search space (e.g., spaces). In certain embodiments, DRX active times of a UE may be controlled by separate timers (e.g., Uu related DRX timers like on duration timer or DRX inactivity timer, and SL related DRX timer).

In a fifth embodiment, a logical channel prioritization ("LCP") procedure (e.g., destination selection) may consider DRX configurations of the receiving UEs on a PC5 interface to make sure that the receiving UEs are in active time and ready to receive the data transmitted on the allocated resources. In one embodiment of the fifth embodiment, a UE considers a SL LCH for a LCP procedure and/or destination selection upon reception of a SL grant (SL DCI), if the SL resources allocated by the SL DCI fall within a transmission and/or reception window associated with the SL LCH. If the UE has SL data of SL LCH x in its buffer when a SL grant is received and the active time associated with the SL LCH x doesn't overlap with the SL resources (e.g., allocated by the SL grant), the UE may not consider SL LCH x for LCP (e.g., destination selection).

In a sixth embodiment, a UE transmits a SR (e.g., triggered by a SL BSR) not earlier than a predefined time (e.g., x ms) before a start of a corresponding "transmission and/or reception window" on PC5 interface to facilitate that the SL resources allocated by a gNB in response to the reception of a SL SR are within the "transmission and/or reception window". Even though an internal SR triggering may happen at any point of time (e.g., based on SL data arrival), the UE may delay the transmission of a SR such that the SR transmission doesn't occur earlier than a predefined time before the start of a corresponding "SL transmission and/or reception window".

Figure 4:
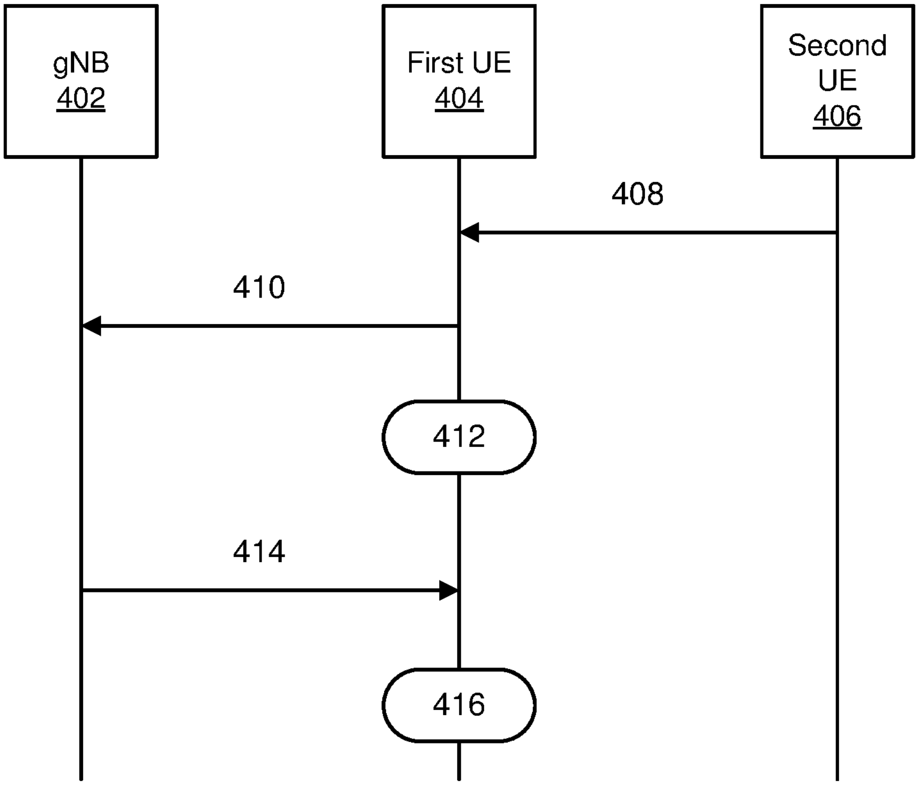
FIG. 4 is a schematic block diagram illustrating one embodiment of a system having communications for indication of a request for sidelink resources.

FIG. 4 is a schematic block diagram illustrating one embodiment of a system 400 having communications for indication of a request for sidelink resources. The system 400 includes a gNB 402, a first UE 404, and a second UE 406. As may be appreciated, any of the communications in the system 400 may include one or more messages.

In a first communication 408 transmitted from the second UE 406 to the first UE 404, the second UE 406 transmits a hybrid automatic repeat request feedback message over a first radio interface (e.g., PC5 interface) to the first UE 404.

In a second communication 410 transmitted from the first UE 404 to the gNB 406, the first UE 404, in response to determining that the hybrid automatic repeat request feedback message indicates an unsuccessful decoding of a corresponding transport block, transmits a negative acknowledgment on a physical uplink control channel of a second radio interface (e.g., Uu interface) to the gNB 406. The negative acknowledgment indicates a request for sidelink resources on the first radio interface.

The first UE 404 starts 412 a timer in response to transmitting the negative acknowledgment.

In a third communication 414 transmitted from the gNB 406 to the first UE 404, the gNB 406 transmits a physical downlink control channel on the second radio interface for downlink control information to the first UE 404.

The first UE 404 monitors 416 for the physical downlink control channel on the second radio interface for downlink control information while the timer is running.

Figure 5:
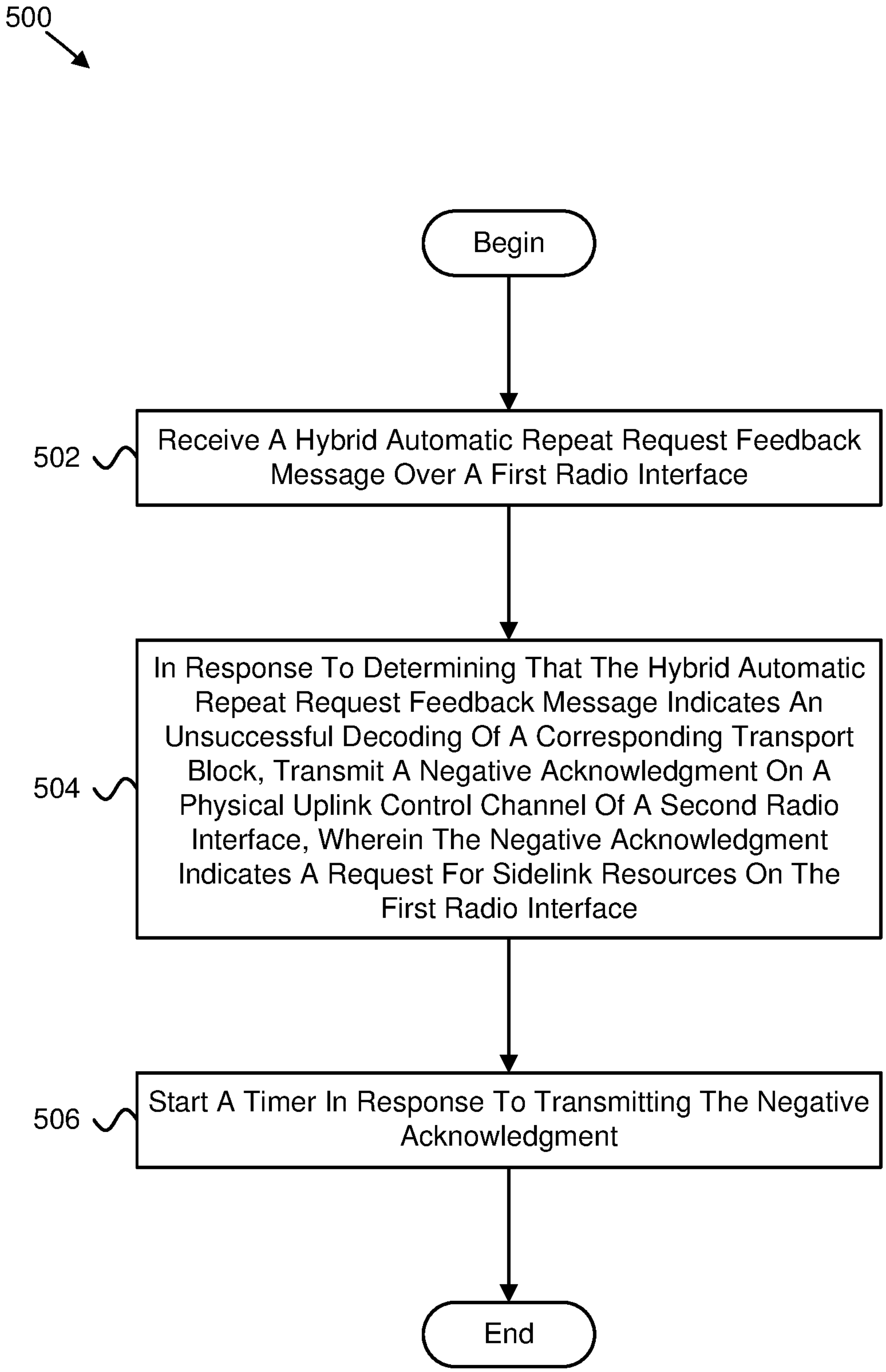
FIG. 5 is a flow chart diagram illustrating one embodiment of a method for indication of a request for sidelink resources.

FIG. 5 is a flow chart diagram illustrating one embodiment of a method 500 for indication of a request for sidelink resources. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

In various embodiments, the method 500 includes receiving 502 a hybrid automatic repeat request feedback message over a first radio interface. In some embodiments, the method 500 includes, in response to determining that the hybrid automatic repeat request feedback message indicates an unsuccessful decoding of a corresponding transport block, transmitting 504 a negative acknowledgment on a physical uplink control channel of a second radio interface. The negative acknowledgment indicates a request for sidelink resources on the first radio interface. In certain embodiments, the method 500 includes starting 506 a timer in response to transmitting the negative acknowledgment.

In certain embodiments, the method 500 further comprises monitoring a physical downlink control channel on the second radio interface for downlink control information while the timer is running. In some embodiments, the downlink control information comprises sidelink downlink control information.

In various embodiments, the hybrid automatic repeat request feedback message is received on a physical sidelink feedback channel over the first radio interface. In one embodiment, the timer comprises a discontinuous reception retransmission sidelink timer.

Figure 6:
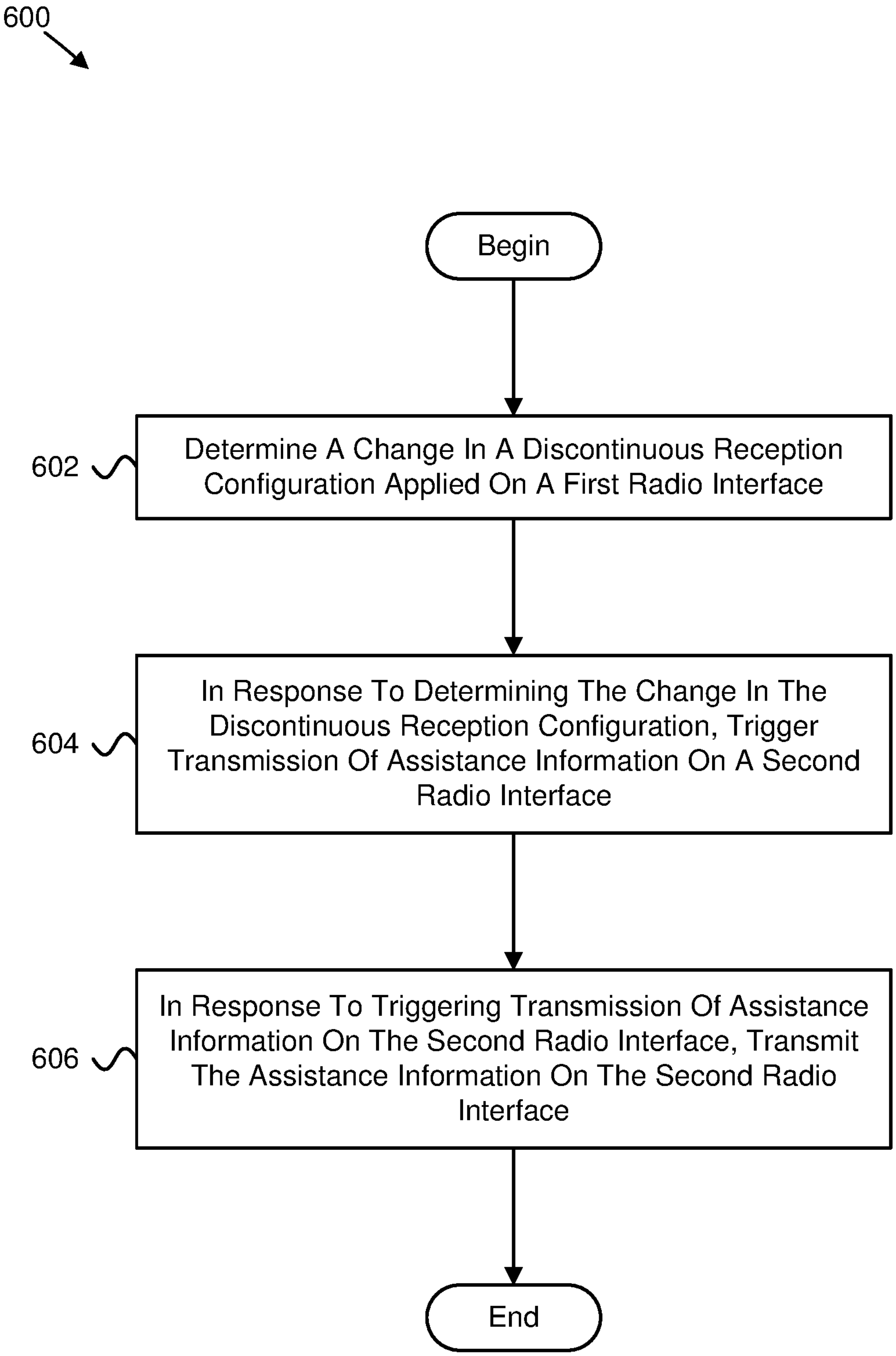
FIG. 6 is a flow chart diagram illustrating one embodiment of a method for providing assistance information.

FIG. 6 is a flow chart diagram illustrating one embodiment of a method 600 for providing assistance information. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes determining 602 a change in a discontinuous reception configuration applied on a first radio interface. In some embodiments, the method 600 includes, in response to determining the change in the discontinuous reception configuration, triggering 604 transmission of assistance information on a second radio interface. In certain embodiments, the method 600 includes, in response to triggering transmission of assistance information on the second radio interface, transmitting 606 the assistance information on the second radio interface.

In certain embodiments, the assistance information comprises a plurality of sidelink discontinuous reception configurations, transmission window information, reception window information, or a combination thereof for the first radio interface. In some embodiments, the method 600 further comprises, in response to transmitting the assistance information, receiving discontinuous reception configuration information for the second radio interface. In various embodiments, the discontinuous reception configuration information is determined based on the assistance information.

Figure 7:
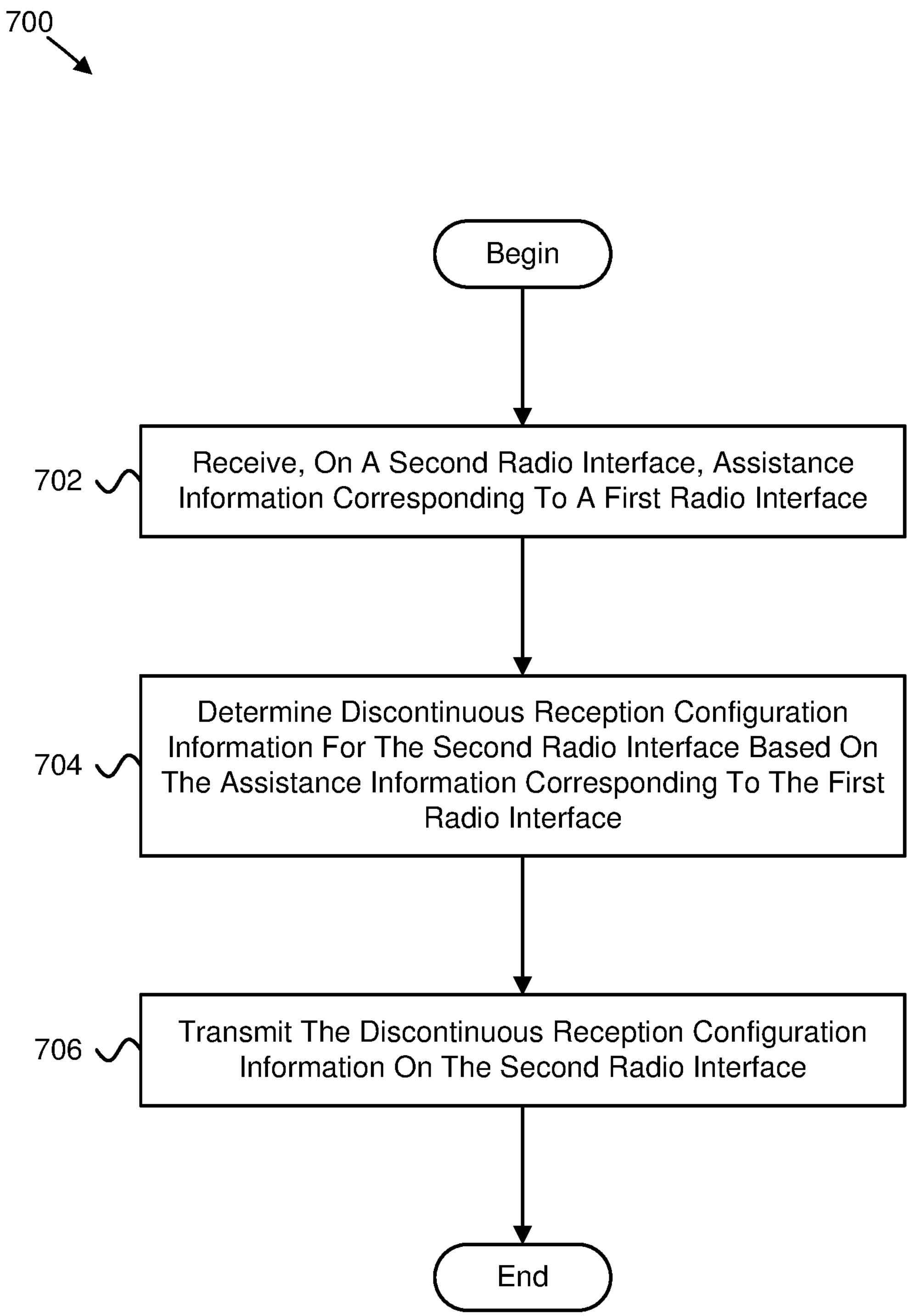
FIG. 7 is a flow chart diagram illustrating one embodiment of a method for receiving assistance information.

FIG. 7 is a flow chart diagram illustrating one embodiment of a method 700 for receiving assistance information. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes receiving 702, on a second radio interface, assistance information corresponding to a first radio interface. In some embodiments, the method 700 includes determining 704 discontinuous reception configuration information for the second radio interface based on the assistance information corresponding to the first radio interface. In certain embodiments, the method 700 includes transmitting 706 the discontinuous reception configuration information on the second radio interface.

In certain embodiments, the assistance information comprises a plurality of sidelink discontinuous reception configurations, transmission window information, reception window information, or a combination thereof for the first radio interface.

Figure 8:
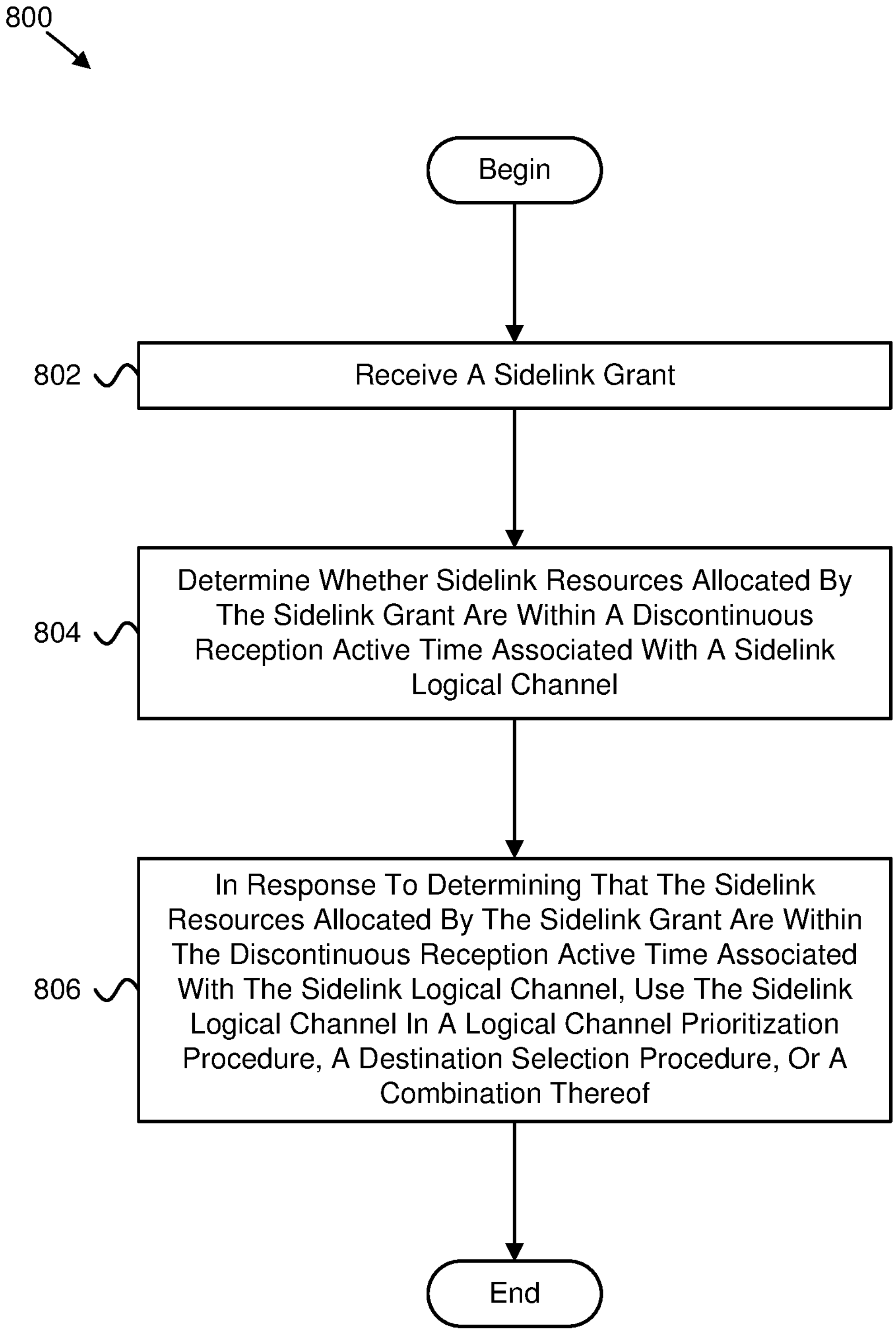
FIG. 8 is a flow chart diagram illustrating one embodiment of a method for sidelink resource determination.

FIG. 8 is a flow chart diagram illustrating one embodiment of a method 800 for sidelink resource determination. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes receiving 802 a sidelink grant. In some embodiments, the method 800 includes determining 804 whether sidelink resources allocated by the sidelink grant are within a discontinuous reception active time associated with a sidelink logical channel. In certain embodiments, the method 800 includes, in response to determining that the sidelink resources allocated by the sidelink grant are within the discontinuous reception active time associated with the sidelink logical channel, using 806 the sidelink logical channel in a logical channel prioritization procedure, a destination selection procedure, or a combination thereof.

In certain embodiments, the method 800 further comprises determining whether sidelink data is in a buffer for the sidelink logical channel. In some embodiments, the method 800 further comprises, in response to determining that sidelink data is in the buffer for the sidelink logical channel, determining whether resources allocated by the sidelink grant overlap with the discontinuous reception active time associated with the sidelink logical channel.

In various embodiments, the method 800 further comprises, in response to determining that resources allocated by the sidelink grant do not overlap with the discontinuous reception active time associated with the sidelink logical channel, not selecting the sidelink logical channel as part of the logical channel prioritization procedure, the destination selection procedure, or the combination thereof. In one embodiment, the method 800 further comprises, in response to determining that resources allocated by the sidelink grant overlap with the discontinuous reception active time associated with the sidelink logical channel, selecting the sidelink logical channel as part of the logical channel prioritization procedure, the destination selection procedure, or the combination thereof.

In one embodiment, a method comprises: receiving a hybrid automatic repeat request feedback message over a first radio interface; in response to determining that the hybrid automatic repeat request feedback message indicates an unsuccessful decoding of a corresponding transport block, transmitting a negative acknowledgment on a physical uplink control channel of a second radio interface, wherein the negative acknowledgment indicates a request for sidelink resources on the first radio interface; and starting a timer in response to transmitting the negative acknowledgment.

In certain embodiments, the method further comprises monitoring a physical downlink control channel on the second radio interface for downlink control information while the timer is running.

In some embodiments, the downlink control information comprises sidelink downlink control information.

In various embodiments, the hybrid automatic repeat request feedback message is received on a physical sidelink feedback channel over the first radio interface.

In one embodiment, the timer comprises a discontinuous reception retransmission sidelink timer.

In one embodiment, an apparatus comprises: a receiver that receives a hybrid automatic repeat request feedback message over a first radio interface; a transmitter that, in response to determining that the hybrid automatic repeat request feedback message indicates an unsuccessful decoding of a corresponding transport block, transmits a negative acknowledgment on a physical uplink control channel of a second radio interface, wherein the negative acknowledgment indicates a request for sidelink resources on the first radio interface; and a processor that starts a timer in response to transmitting the negative acknowledgment.

In certain embodiments, the processor monitors a physical downlink control channel on the second radio interface for downlink control information while the timer is running.

In some embodiments, the downlink control information comprises sidelink downlink control information.

In various embodiments, the hybrid automatic repeat request feedback message is received on a physical sidelink feedback channel over the first radio interface.

In one embodiment, the timer comprises a discontinuous reception retransmission sidelink timer.

In one embodiment, a method comprises: determining a change in a discontinuous reception configuration applied on a first radio interface; in response to determining the change in the discontinuous reception configuration, triggering transmission of assistance information on a second radio interface; and in response to triggering transmission of assistance information on the second radio interface, transmitting the assistance information on the second radio interface.

In certain embodiments, the assistance information comprises a plurality of sidelink discontinuous reception configurations, transmission window information, reception window information, or a combination thereof for the first radio interface.

In some embodiments, the method further comprises, in response to transmitting the assistance information, receiving discontinuous reception configuration information for the second radio interface.

In various embodiments, the discontinuous reception configuration information is determined based on the assistance information.

In one embodiment, an apparatus comprises: a processor that: determines a change in a discontinuous reception configuration applied on a first radio interface; and, in response to determining the change in the discontinuous reception configuration, triggers transmission of assistance information on a second radio interface; and a transmitter that, in response to triggering transmission of assistance information on the second radio interface, transmits the assistance information on the second radio interface.

In certain embodiments, the assistance information comprises a plurality of sidelink discontinuous reception configurations, transmission window information, reception window information, or a combination thereof for the first radio interface.

In some embodiments, the apparatus further comprises a receiver that, in response to transmitting the assistance information, receives discontinuous reception configuration information for the second radio interface.

In various embodiments, the discontinuous reception configuration information is determined based on the assistance information.

In one embodiment, a method comprises: receiving, on a second radio interface, assistance information corresponding to a first radio interface; determining discontinuous reception configuration information for the second radio interface based on the assistance information corresponding to the first radio interface; and transmitting the discontinuous reception configuration information on the second radio interface.

In certain embodiments, the assistance information comprises a plurality of sidelink discontinuous reception configurations, transmission window information, reception window information, or a combination thereof for the first radio interface.

In one embodiment, an apparatus comprises: a receiver that receives, on a second radio interface, assistance information corresponding to a first radio interface; a processor that determines discontinuous reception configuration information for the second radio interface based on the assistance information corresponding to the first radio interface; and a transmitter that transmits the discontinuous reception configuration information on the second radio interface.

In certain embodiments, the assistance information comprises a plurality of sidelink discontinuous reception configurations, transmission window information, reception window information, or a combination thereof for the first radio interface.

In one embodiment, a method comprises: receiving a sidelink grant; determining whether sidelink resources allocated by the sidelink grant are within a discontinuous reception active time associated with a sidelink logical channel; and in response to determining that the sidelink resources allocated by the sidelink grant are within the discontinuous reception active time associated with the sidelink logical channel, using the sidelink logical channel in a logical channel prioritization procedure, a destination selection procedure, or a combination thereof.

In certain embodiments, the method further comprises determining whether sidelink data is in a buffer for the sidelink logical channel.

In some embodiments, the method further comprises, in response to determining that sidelink data is in the buffer for the sidelink logical channel, determining whether resources allocated by the sidelink grant overlap with the discontinuous reception active time associated with the sidelink logical channel.

In various embodiments, the method further comprises, in response to determining that resources allocated by the sidelink grant do not overlap with the discontinuous reception active time associated with the sidelink logical channel, not selecting the sidelink logical channel as part of the logical channel prioritization procedure, the destination selection procedure, or the combination thereof.

In one embodiment, the method further comprises, in response to determining that resources allocated by the sidelink grant overlap with the discontinuous reception active time associated with the sidelink logical channel, selecting the sidelink logical channel as part of the logical channel prioritization procedure, the destination selection procedure, or the combination thereof.

In one embodiment, an apparatus comprises: a receiver that receives a sidelink grant; and a processor that: determines whether sidelink resources allocated by the sidelink grant are within a discontinuous reception active time associated with a sidelink logical channel; and, in response to determining that the sidelink resources allocated by the sidelink grant are within the discontinuous reception active time associated with the sidelink logical channel, uses the sidelink logical channel in a logical channel prioritization procedure, a destination selection procedure, or a combination thereof.

In certain embodiments, the processor determines whether sidelink data is in a buffer for the sidelink logical channel.

In some embodiments, the processor, in response to determining that sidelink data is in the buffer for the sidelink logical channel, determines whether resources allocated by the sidelink grant overlap with the discontinuous reception active time associated with the sidelink logical channel.

In various embodiments, the processor, in response to determining that resources is allocated by the sidelink grant do not overlap with the discontinuous reception active time associated with the sidelink logical channel, does not select the sidelink logical channel as part of the logical channel prioritization procedure, the destination selection procedure, or the combination thereof.

In one embodiment, the processor, in response to determining that resources allocated by the sidelink grant overlap with the discontinuous reception active time associated with the sidelink logical channel, selects the sidelink logical channel as part of the logical channel prioritization procedure, the destination selection procedure, or the combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:

at least one memory; and at least one processor coupled with the at least one memory and configured to cause the UE to:

receive a hybrid automatic repeat request (HARQ) feedback message for a HARQ process over a first radio interface;

in response to determining that the HARQ feedback message indicates an unsuccessful decoding of a corresponding transport block for the HARQ process, transmit a negative acknowledgment on a physical uplink control channel (PUCCH) of a second radio interface for the corresponding HARQ process, wherein the negative acknowledgment indicates that the decoding of the transport block for the HARQ process on the first radio interface was not successful; and start a discontinuous reception (DRX) retransmission sidelink timer for the corresponding HARQ process in response to transmitting the negative acknowledgment on the PUCCH of the second radio interface.

2. The UE of claim 1, wherein the at least one processor is configured to cause the UE to monitor a physical downlink control channel (PDCCH) on the second radio interface for downlink control information (DCI) while the DRX retransmission sidelink timer is running.

3. The UE of claim 2, wherein the DCI comprises sidelink DCI.

4. A base station, comprising:

at least one memory; and at least one processor coupled with the at least one memory and configured to cause the base station to:

receive, on a second radio interface associated with communications between the base station and a first user equipment (UE), assistance information corresponding to a first radio interface associated with communications between the first UE and a second UE, wherein the assistance information comprises a sidelink DRX configuration comprising a superset of multiple sidelink transmission and reception windows which is created based on an overlap of the multiple sidelink transmission and reception windows;

determine discontinuous reception configuration information for the second radio interface based on the assistance information corresponding to the first radio interface; and transmit the discontinuous reception configuration information on the second radio interface.

5. A user equipment (UE), comprising:

at least one memory; and at least one processor coupled with the at least one memory and configured to cause the UE to:

receive a sidelink grant;

determine whether sidelink resources allocated by the sidelink grant are within a PC5 discontinuous reception (DRX) active time associated with a destination for each sidelink logical channel of a plurality of sidelink logical channels;

in response to determining that the sidelink resources allocated by the sidelink grant are within the PC5 DRX active time associated with multiple sidelink logical channels of the plurality of sidelink logical channels, use the sidelink logical channel in a logical channel prioritization (LCP) procedure, or a destination selection procedure, or both; and in response to a time to a start of a transmission window being greater than a threshold time, delay use of the sidelink logical channel.

6. The UE of claim 5, wherein the at least one processor is configured to cause the UE to determine whether sidelink data is in a buffer for the sidelink logical channel.

7. The UE of claim 6, wherein the at least one processor is configured to cause the UE to, in response to determining that sidelink data is in the buffer for the sidelink logical channel, determine whether resources allocated by the sidelink grant overlap with the DRX active time associated with the sidelink logical channel.

8. The UE of claim 7, wherein the at least one processor is configured to cause the UE to, in response to determining that resources allocated by the sidelink grant do not overlap with the DRX active time associated with the sidelink logical channel, not select the sidelink logical channel as part of the LCP procedure, or the destination selection procedure, or both.

9. The UE of claim 7, wherein the at least one processor is configured to cause the UE to, in response to determining that resources allocated by the sidelink grant overlap with the DRX active time associated with the sidelink logical channel, select the sidelink logical channel as part of the LCP procedure, or the destination selection procedure, or both.

10. The UE of claim 1, wherein the at least one processor is configured to cause the UE to monitor for sidelink downlink control information (DCI) that allocates sidelink resources for the HARQ process for a retransmission.

11. The UE of claim 1, wherein the first radio interface corresponds to a sidelink transmission on a PC5 interface.

12. The UE of claim 1, wherein the second radio interface corresponds to a Uu interface between the UE and a base station.

13. The base station of claim 4, wherein the first radio interface corresponds to a sidelink transmission on a PC5 interface.

14. The base station of claim 4, wherein the second radio interface corresponds to a Uu interface between the first UE and the base station.

15. A method performed by a user equipment (UE), the method comprising:

receiving a hybrid automatic repeat request (HARQ) feedback message for a HARQ process over a first radio interface;

in response to determining that the HARQ feedback message indicates an unsuccessful decoding of a corresponding transport block for the HARQ process, transmitting a negative acknowledgment on a physical uplink control channel (PUCCH) of a second radio interface for the corresponding HARQ process, wherein the negative acknowledgment indicates that the decoding of the transport block for the HARQ process on the first radio interface was not successful; and starting a discontinuous reception (DRX) retransmission sidelink timer for the corresponding HARQ process in response to transmitting the negative acknowledgment on the PUCCH of the second radio interface.

16. The method of claim 15, further comprising monitoring a physical downlink control channel (PDCCH) on the second radio interface for downlink control information (DCI) while the timer is running.

17. The method of claim 16, wherein the DCI comprises sidelink DCI.

* * * * *